(12) United States Patent
Shaw

(10) Patent No.: US 7,211,015 B2
(45) Date of Patent: May 1, 2007

(54) BELT INSTALLATION TOOL

(75) Inventor: John Shaw, White Lake, MI (US)

(73) Assignee: The Gates Corporation, Denver, CO (US)

( * ) Notice: Subject to any disclaimer, the term of this patent is extended or adjusted under 35 U.S.C. 154(b) by 541 days.

(21) Appl. No.: 10/818,507

(22) Filed: Apr. 5, 2004

(65) Prior Publication Data
US 2005/0221933 A1 Oct. 6, 2005

(51) Int. Cl.
F16H 7/24 (2006.01)
(52) U.S. Cl. .................................. 474/130
(58) Field of Classification Search ............... 474/130, 474/129, 119–121; 254/100, 120, 131, 134, 254/237
See application file for complete search history.

(56) References Cited

U.S. PATENT DOCUMENTS

| 248,587 | A | | 10/1881 | Gray | |
|---|---|---|---|---|---|
| 458,913 | A | * | 9/1891 | Morgan et al. | 474/119 |
| 577,096 | A | | 2/1897 | Zahniser | |
| 614,310 | A | * | 11/1898 | Rupp | 474/130 |
| 654,052 | A | * | 7/1900 | Cliff et al. | 474/130 |
| 697,608 | A | * | 4/1902 | Coulter | 474/130 |
| 758,081 | A | | 4/1904 | Kottusch | |
| 2,572,789 | A | | 10/1951 | Weikart et al. | 157/1.22 |
| 4,109,544 | A | | 8/1978 | Clark | 74/242.7 |
| 4,111,063 | A | | 9/1978 | Journey | 74/242.6 |
| 4,193,310 | A | | 3/1980 | Boyer et al. | 74/230.3 |
| 4,325,703 | A | | 4/1982 | Phillips | 474/130 |
| 4,929,219 | A | * | 5/1990 | Baker | 474/119 |
| 5,318,479 | A | | 6/1994 | Lawroski | 474/130 |
| 5,653,654 | A | | 8/1997 | Davis | 474/119 |
| 6,033,331 | A | | 3/2000 | Winninger et al. | 474/260 |
| 6,334,827 | B1 | | 1/2002 | Tsuchiya | 474/119 |
| 6,402,649 | B1 | | 6/2002 | Amkreutz | 474/130 |
| 6,692,391 | B2 | | 2/2004 | Gerring et al. | 474/130 |
| 6,783,473 | B2 | * | 8/2004 | De Meester et al. | 474/130 |
| 2002/0107098 | A1 | | 8/2002 | Amkreutz | 474/130 |
| 2003/0211910 | A1 | | 11/2003 | Gerring et al. | 474/130 |

FOREIGN PATENT DOCUMENTS

| DE | 48411 | 3/1889 |
|---|---|---|
| DE | 244239 | 12/1910 |
| DE | 277982 | 6/1912 |

(Continued)

Primary Examiner—Marcus Charles
(74) Attorney, Agent, or Firm—J. A. Thurnau, Esq.; C. H. Castleman, Esq.; J. L. Mahurin, Esq.

(57) ABSTRACT

A belt installation tool having a first member (18) engagable with a pulley hub whereby a belt installation radial load is transmitted to the pulley hub. A body (10) having a tool engagement portion (15) disposed radially from the pulley hub. A second member (11) radially extending from the body opposite the first member, the second member having a lateral urging surface (12) for laterally urging a belt into a pulley groove. A roller (17) having a conical surface (17A) extending normally from the body at a radius substantially equal to or less than a pulley flange radius and in a direction opposite a pulley, the roller cooperatively disposed with the lateral urging surface whereby a belt is borne from the roller to the lateral urging surface during belt installation.

15 Claims, 3 Drawing Sheets

FOREIGN PATENT DOCUMENTS

| | | | |
|---|---|---|---|
| EP | 0831247 B1 | 4/1999 | |
| GB | 176461 | 2/1922 | |
| GB | 342453 | 5/1931 | |
| SU | 1004-695 | 3/1983 | ................ 474/130 |
| WO | WO 02/036987 | 10/2002 | |
| WO | WO 03/078866 | 9/2003 | |
| WO | WO 2004/003404 | 8/2004 | |

* cited by examiner

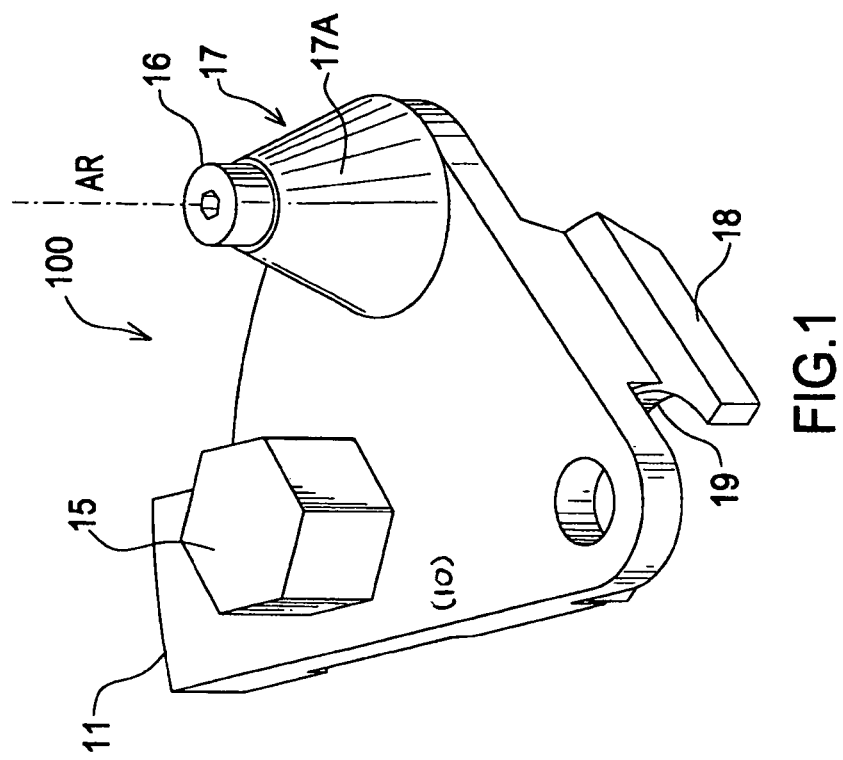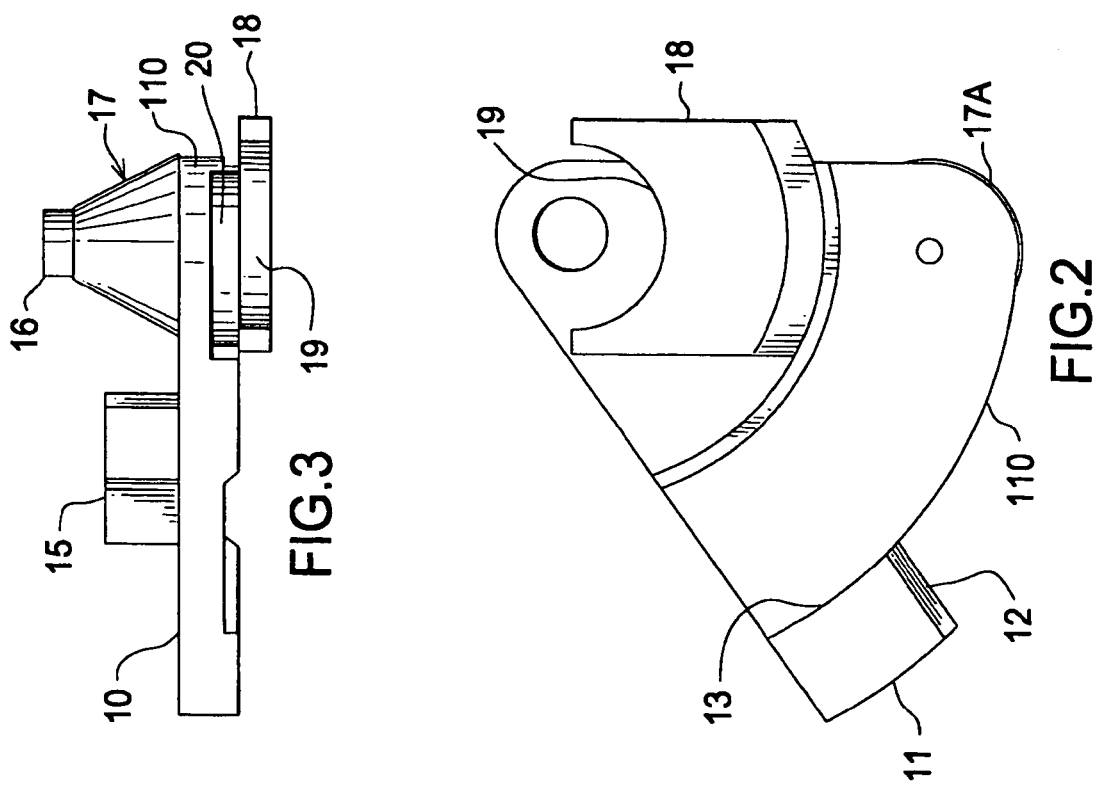

BELT INSTALLATION TOOL

FIELD OF THE INVENTION

The invention relates to a belt installation tool, and more particularly, to a belt installation tool for laterally urging a belt into a pulley groove while substantially eliminating lateral forces on a pulley.

BACKGROUND OF THE INVENTION

Belt drive systems comprise a significant and widely used form of mechanical power transmission. Generally a belt runs between two or more pulleys, more particularly a driver and driven pulley and idlers.

In order to efficiently transmit power between the pulleys, the belt is installed with a predetermined preload or tension. The amount of tension is generally a function of the horsepower and torque requirements of the drive. Increased horsepower or torque requirements will generally require a commensurate increase in the belt tension.

In order to achieve the proper tension, one or more of the pulleys are loosened during belt installation so the shaft or shafts can be moved to allow a slack condition in the belt. Then, the belt is looped over the pulleys. The loosened pulley or pulleys are then pulled or tightened into a predetermined position, resulting in a belt tension being created in the belt. This process requires the pulley(s) to be mechanically adjusted in order to properly preload the belt.

Belts may be installed on pulley systems using other methods. For systems with an automatic tensioning device the tensioner is set, the belt is placed, and the tensioner is released to its operational location.

Another method of installing a belt involves use of a tool that presses the belt into a pulley groove without the need for mechanically adjusting the pulleys in a fixed center system. The tool stretches the belt while laterally forcing it into a pulley groove while imposing lateral forces on the pulley.

Representative of the art is U.S. Pat. No. 6,692,391 B2 to Gerring et al. (2004) which discloses a tool for installation and removal of power transmission belts from fixed center pulleys in a power transmission system.

Reference is also made to co-pending application Ser. No. 10/437,803 filed May 14, 2003 which discloses a belt installation tool.

What is needed is a belt installation tool that substantially eliminates lateral forces on a pulley during belt installation. What is needed is a belt installation tool having a roller extending from the body at a radius equal to or less than a pulley flange radius and in a direction substantially normal to a pulley plane defined by a pulley groove. What is needed is a belt installation tool having an arcuate portion for engaging a pulley hub rim. The present invention meets these needs.

SUMMARY OF THE INVENTION

The primary aspect of the invention is to provide a belt installation tool that substantially eliminates lateral forces on a pulley during belt installation.

Another aspect of the invention is to provide a belt installation tool having a roller extending from the body at a radius equal to or less than a pulley flange radius and in a direction substantially normal to a pulley plane defined by a pulley groove.

Another aspect of the invention is to provide a belt installation tool having an arcuate portion for engaging a pulley hub rim.

Other aspects of the invention will be pointed out or made obvious by the following description of the invention and the accompanying drawings.

The invention comprises a belt installation tool having a first member engagable with a pulley hub whereby a belt installation radial load is transmitted to the pulley hub. A body having a tool engagement portion disposed radially from the pulley hub. A second member radially extending from the body opposite the first member, the second member having a lateral urging surface for laterally urging a belt into a pulley groove. A roller having a conical surface extending normally from the body at a radius substantially equal to or less than a pulley flange radius and in a direction opposite a pulley, the roller cooperatively disposed with the lateral urging surface whereby a belt is borne from the roller to the lateral urging surface during belt installation.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 1 is a perspective view of the inventive tool.
FIG. 2 is a bottom plan view of the tool.
FIG. 3 is a side view of the tool.

DETAILED DESCRIPTION OF THE PREFERRED EMBODIMENT

Figure 4:
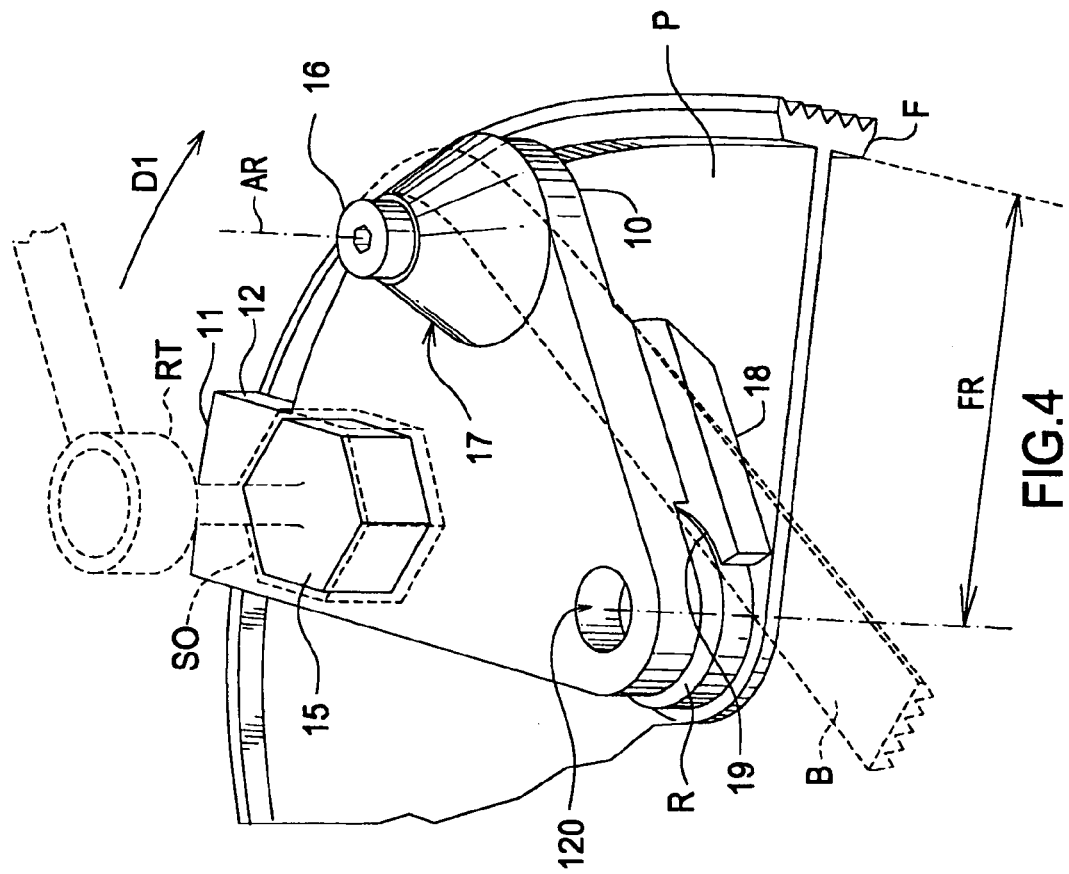
FIG. 4 is a perspective view of the tool in use.

FIG. 1 is a perspective view of the inventive tool. Tool 100 comprises a body 10. Radially projecting from the body 10 is member 11. Member 11 has a length sufficient for it to project radially beyond a pulley flange F so it can laterally urge a belt into a pulley groove, see FIG. 4.

Tool engaging member 15 is disposed radially from a pulley hub. Tool engaging member 15 has a form to allow it to be cooperatively engaged by a tool such as a ratchet socket, known in the art. Member 15 is shown having a hexagonal shape for engaging a socket, for example, for a ⅜" or ½" ratchet drive. Of course a wrench, pliers or other suitable tool can be used as well. Member 15 is radially disposed outwardly on a body perimeter from a shaft center (SC) in order to achieve a mechanical torque advantage when the tool is rotated about a pulley hub during belt installation.

In an alternate embodiment, member 15 may instead comprise a recess, hole or socket to receive a drive tool with equal effectiveness.

Roller member 17 is rotatably installed on shaft 16. Roller 17 extends from body 10 at a radius approximately equal to or less than a pulley flange radius (FR), see FIG. 4. A roller axis of rotation (AR) extends in a direction substantially normal to a pulley plane (PP) as defined by a pulley groove, see FIG. 7. Roller 17 extends from the body 10 from a side opposite the pulley.

Shaft 16 and roller 17 are disposed on body 10 so that the broad portion of conical surface 17A aligns cooperatively with an outer portion surface 110 and member 11 of body 10, see FIG. 2. This cooperative arrangement provides for a smooth transition for the belt as it engages roller surface 17A and surface 110 during installation. Surface 110 is arcuate and concave in the direction of a pulley hub rim R.

Tool 100 is engagable with hub rim R and outer flange F of pulley P, see FIG. 4. Hub rim engaging member 18 slidingly engages rim R so that tool 100 orbits about the center of the pulley P during belt installation. During installation pulley P may either rotate or not depending on the system characteristics. If pulley P rotates during installation then the tool rotates with the pulley.

Hub rim member 18 comprises a means for transmitting a belt installation load to the pulley hub. The belt installation load is the load caused by the partial elongation of the belt as it is urged by the tool over the pulley flange and into a pulley groove. A belt installation load is generally in addition to a belt design tension. This is because the amount of belt elongation realized during installation can comprise approximately 1% to 5% of an unloaded belt length, thereby requiring a force in excess of a belt design tension to initially install the belt.

FIG. 2 is a bottom plan view of the tool. Member 11 comprises urging surface 12. Surface 12 extends radially from the hub and is disposed at an angle α with respect to a pulley groove plane PP, see FIG. 7.

During installation a belt is progressively engaged with the pulley P by being urged laterally into a pulley groove by contact with surface 12. This results in the belt approaching and entering the pulley groove G at an angle approximately equal to α°. Angle (α) may be in the range of approximately 0° to approximately 45°.

Lip 13 is radially located on body 10 so that it radially extends beyond and thereby overhangs a pulley flange F. In the preferred embodiment the width of lip 13 is approximately that of a width of the pulley flange, however, this is not intended to constitute a limitation to the width of lip 13.

Member 18 extends from body 10. Member 18 may be an integral part of body 10 or be fastened to body 10 by welding, screws or adhesives known in the art.

FIG. 3 is a side view of the tool. Member 18 comprises an arcuate surface portion 19. Surface portion 19 has a radius that facilitates cooperative engagement of member 18 with a pulley hub rim R. When the tool is engaged with a pulley, hub rim R is engaged in a slot 20 so that tool 100 is guided about the pulley hub rim during belt installation, thereby allowing the tool to properly track about the pulley.

FIG. 4 is a perspective view of the tool in use. A ratchet tool RT and socket SO, each known in the art, are shown engaged with member 15. Belt B is shown partially engaged with pulley P. Member 18 is shown engaged with a pulley hub rim R. Belt B is shown bearing upon roller 17, surface 110 and surface 12. Tool 100 is rotated in direction D1 during belt installation. Roller 17 may rotate as it supports the belt while the tool is rotated about the pulley hub during belt installation.

A particular advantage of the inventive tool is that it substantially eliminates significant lateral forces imposed upon the pulley flange F during the belt installation process. Namely, the belt installation force is transmitted from the tool to the pulley shaft through member 18. Surface 13 does not come into significant load bearing contact with the pulley flange F. The forces imposed upon the belt to install it in the pulley groove G are substantially borne by roller 17 and surface 110 until the belt is aligned with and ultimately engaged with the groove. Further, no significant lateral forces (substantially normal to plane P—P) are imposed on the pulley because during installation a force applied through member 15 by a user bearing on a ratchet tool counters a thrust vector caused by surface 12 urging the belt into the pulley groove. This is particularly advantageous for installing a belt on a pulley comprising phenolic, plastic, composite or other metallic or non-metallic material that has a limited lateral load bearing capability, namely, for a load having a significant vector component disposed substantially normal to, or, at a non-zero angle to a pulley radial plane (PP) as defined by a pulley groove. Hence, this tool is particularly advantageous when used to install a belt on a non-metallic pulley which may be brittle and/or otherwise subject to fracture or breaking if undue lateral forces are imposed on it during belt installation.

Figure 5:
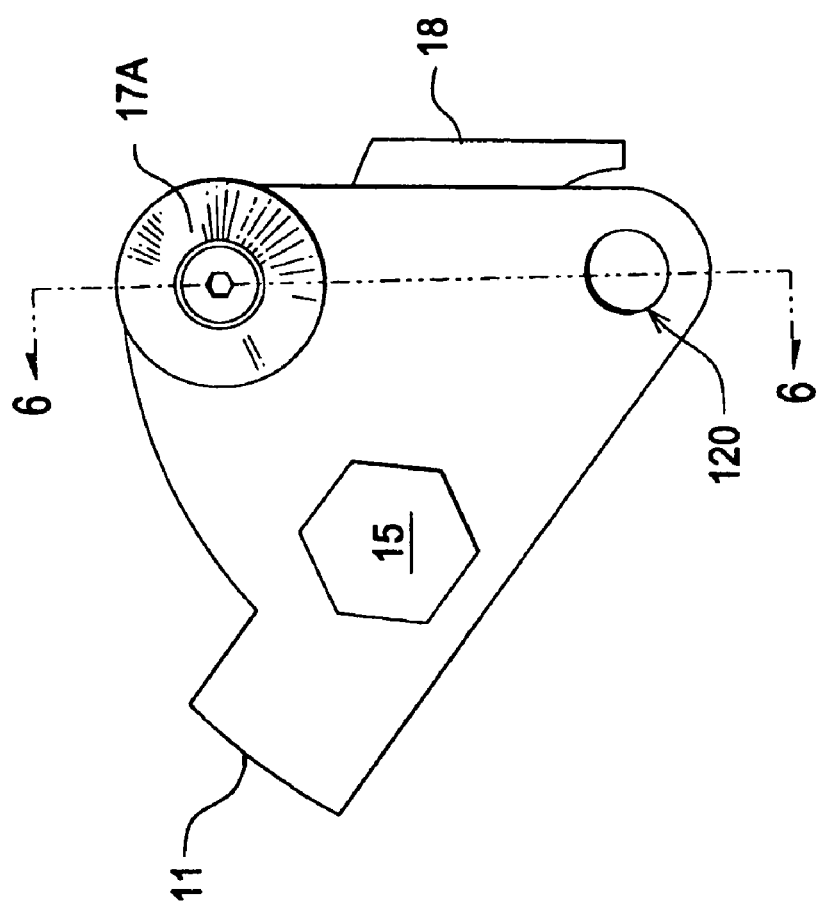
FIG. 5 is a top plan view of the tool.

FIG. 5 is a top plan view of the tool. Hole 120 may be used to allow a shaft projection (not shown) to extend through body 10 or to otherwise engage a shaft projection. Hole 120 substantially aligns with a pulley shaft center SC.

The relative triangular positioning of member 15, roller 17 and member 18 on body 10, in combination with the belt force as the tool is used results in a favorable balance of forces. Namely, the sum of the force imparted by a ratchet tool on member 15 plus the force caused by the belt acting on roller 17 gives a resultant vector that is directed toward member 18 and the pulley hub. This stabilizes and holds the tool on the hub on portion 19 and in slot 20 during use such that engagement with the pulley hub is maintained throughout the installation process. In some instances it may not be necessary to engage slot 20 and instead being sufficient that only portion 19 bears upon a pulley hub rim. Please see FIG. 8.

Figure 6:
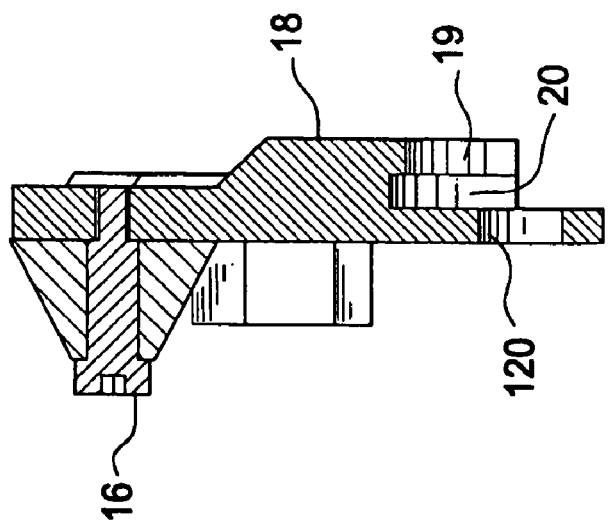
FIG. 6 is a cross-section along line 6—6 in FIG. 5.

FIG. 6 is a cross-section along line 6—6 in FIG. 5. Arcuate slot 20 is shown for engaging a hub rim R. Portion surface 19 may also bear upon the pulley hub. Shaft 16 is shown threaded into body 10, but may also be pressed or welded into place as well.

Figure 7:
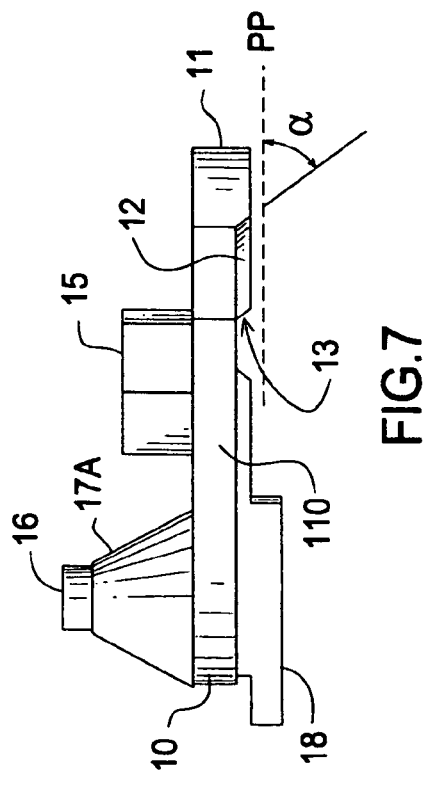
FIG. 7 is a side view of the tool.

FIG. 7 is a side view of the tool. Surface 12 is disposed at angle α to a pulley plane PP. Surface 110 is disposed between roller 17 and surface 12. Surface 110 bears a belt installation load and provides a transition area for the belt in order to avoid imparting a potentially severe bend in the belt as it is urged over the pulley flange.

Surface 110 may also describe a partial helical section in an alternate embodiment, namely, a radius from center SC to the intersection of surface 110 with surface 17A is slightly less than the radius to the intersection with surface 12 so that the belt is gradually urged outward as the belt engages surface 110 from surface 17A to surface 12 and then into the pulley. In the preferred embodiment surface 110 has a constant radius from center SC.

Figure 8:
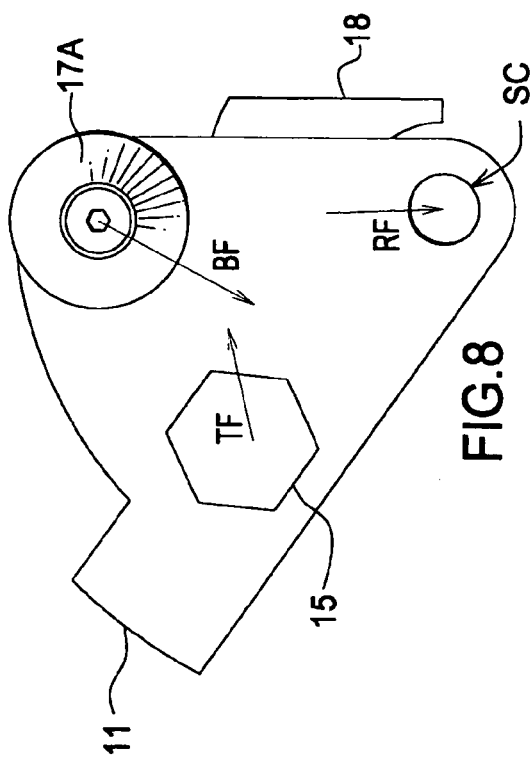
FIG. 8 is a depiction of forces acting on the tool during installation of a belt.

FIG. 8 is a depiction of forces acting on the tool during installation of a belt. Tool force vector TF when added to belt force vector BF gives a resultant vector RF. Vector RF maintains engagement of the tool with a pulley hub during belt installation. Forces TF, BF and RF act substantially parallel to pulley plane PP. One can see that substantially all of the forces generated during installation are transmitted to the pulley hub and are not borne by the pulley flange, excepting of course the radially acting belt tension once the belt is installed. An equal and opposite force to RF is generated by a pulley shaft and is borne by member 18.

Once the belt is installed, the tool is easily removed from the pulley.

The tool may comprise known tool materials such as aluminum or steel. It may also comprise a non-metallic material such as known thermosetting plastics which results in the tool being significantly lighter than a like metallic tool. Other non-limiting material examples also include PVC, CTFE, and ABS, as well as combinations of two or more of the foregoing.

Although a single form of the invention has been described herein, it will be obvious to those skilled in the art that variations may be made in the construction and relation of parts without departing from the spirit and scope of the invention described herein.

I claim:

1. A belt installation tool comprising:
   a first member engagable with a pulley hub whereby a belt installation radial load is transmitted to the pulley hub;
   a body having a tool engagement portion disposed radially from the pulley hub;
   a second member radially extending from the body opposite the first member, the second member having a lateral urging surface for laterally urging a belt into a pulley groove;
   a roller having a conical surface extending normally from the body at a radius substantially equal to or less than a pulley flange radius and in a direction opposite a pulley; and
   the roller cooperatively disposed with the lateral urging surface whereby the belt is borne from the roller to the lateral urging surface during belt installation.

2. The belt installation tool as in claim 1, wherein the lateral urging surface is disposed at an angle relative to a pulley groove centerline.

3. The belt installation tool as in claim 1, wherein the tool engagement portion comprises means for engaging a tool.

4. The belt installation tool as in claim 1 further comprising a second surface disposed between the roller and the lateral urging surface, the second surface supporting the belt as the belt is borne from the roller to the lateral urging surface during belt installation.

5. The belt installation tool as in claim 1, wherein the first member further comprises an arcuate portion engagable with a pulley hub rim.

6. The belt installation tool as in claim 1, wherein the pulley comprises a material selected from the group comprising phenolic, plastic, composite, or other metallic or non-metallic material, or a combination of two or more of the foregoing.

7. A belt installation tool comprising a body having means for engaging a pulley hub for orbital movement of the tool about the hub, the improvement characterized by:
   means for laterally urging a belt into a pulley grove without imposing lateral forces upon the pulley;
   means for transmitting substantially all of a radial belt installation load to the pulley hub; and
   conical roller means tot supporting the belt extending normally to a pulley plane opposite a pulley with respect to the body and disposed at a radius equal to or less than a pulley flange radius.

8. A belt installation tool comprising:
   a body having a hub engaging portion comprising an arcuate slot;
   a tool engaging member disposed radially from a pulley hub;
   a roller member having a conical form rotatably disposed on the body and disposed radially from the hub engaging portion;
   an urging surface for laterally urging a belt on the body, the urging surface radially disposed from the hub engaging portion and cooperatively disposed with respect to the roller member;
   the roller member and urging surface cooperatively disposed with respect to a pulley flange to urge the belt into a pulley groove without imposing a significant lateral force on the pulley.

9. The belt installation tool as in claim 8 further comprising a surface for engaging the belt cooperatively disposed between the urging surface and the roller member.

10. The belt installation tool as in claim 9, wherein the surface is an arcuate surface.

11. A belt installation tool comprising:
    a body having a tool engaging portion, a radially extending surface for laterally urging a belt, a pulley hub engaging portion, and a conical roller disposed in a plane substantially normal to a pulley plane; and
    the tool engaging portion and the hub engaging portion and the conical roller disposed on the body such that a resultant force vector (RF) is substantially parallel to a pulley plane (PP) and has a direction substantially radially toward the pulley hub during belt installation.

12. The belt installation tool as in claim 11, wherein the tool engaging portion and the hub engaging portion and the conical roller are disposed in a triangular relationship.

13. The belt installation tool as in claim 11, wherein the hub engaging portion further comprises an arcuate slot.

14. The belt installation tool as in claim 11, wherein the radially extending surface is disposed at an angle ($\alpha$) to the pulley plane (PP).

15. The belt installation tool as in claim 11, wherein the body further comprises a hole disposed to cooperatively align with a pulley shaft.

* * * * *